United States Patent [19]
Higgins

[11] 3,984,313
[45] Oct. 5, 1976

[54] PREFERENTIAL REMOVAL OF AMMONIA AND PHOSPHATES

[75] Inventor: Irwin R. Higgins, Oak Ridge, Tenn.

[73] Assignee: Chemical Separations Corporation, Oak Ridge, Tenn.

[22] Filed: Apr. 21, 1975

[21] Appl. No.: 570,141

Related U.S. Application Data

[63] Continuation of Ser. No. 398,523, Sept. 18, 1973, abandoned.

[52] U.S. Cl. .............................. 210/26; 210/30 R; 210/37 R; 210/38 R
[51] Int. Cl.² ........................................ B01D 15/06
[58] Field of Search ............. 55/70; 210/24, 26, 28, 210/32, 36, 37, 38, 506, 30 R, 34; 260/2.1 E, 2.1 R, 2.1 M, 2.2 R; 423/304, 352

[56] References Cited
UNITED STATES PATENTS

| | | |
|---|---|---|
| 3,139,401 | 6/1964 | Hach .................................. 210/37 |
| 3,428,426 | 2/1969 | Carney et al. ......................... 55/70 |
| 3,475,330 | 10/1969 | Gilles .................................. 210/38 |
| 3,499,837 | 3/1970 | Jaunarajs ........................... 210/506 |
| 3,575,852 | 4/1971 | Hughes ............................... 210/28 |
| 3,579,322 | 5/1971 | Higgins .............................. 210/24 |

Primary Examiner—Charles N. Hart
Assistant Examiner—Ivars Cintins
Attorney, Agent, or Firm—John E. Wilson; Marvin A. Naigur

[57] ABSTRACT

Sewage water containing many pollutants including ammonia and phosphates is treated so that the ammonia and phosphates are preferentially removed through ion exchange while the other contaminants are allowed to remain in the water. Ferric hydroxide is deposited within the matrix of strong acid type cation exchange resin and the resin is rejuvenated with sodium hydroxide.

6 Claims, 1 Drawing Figure

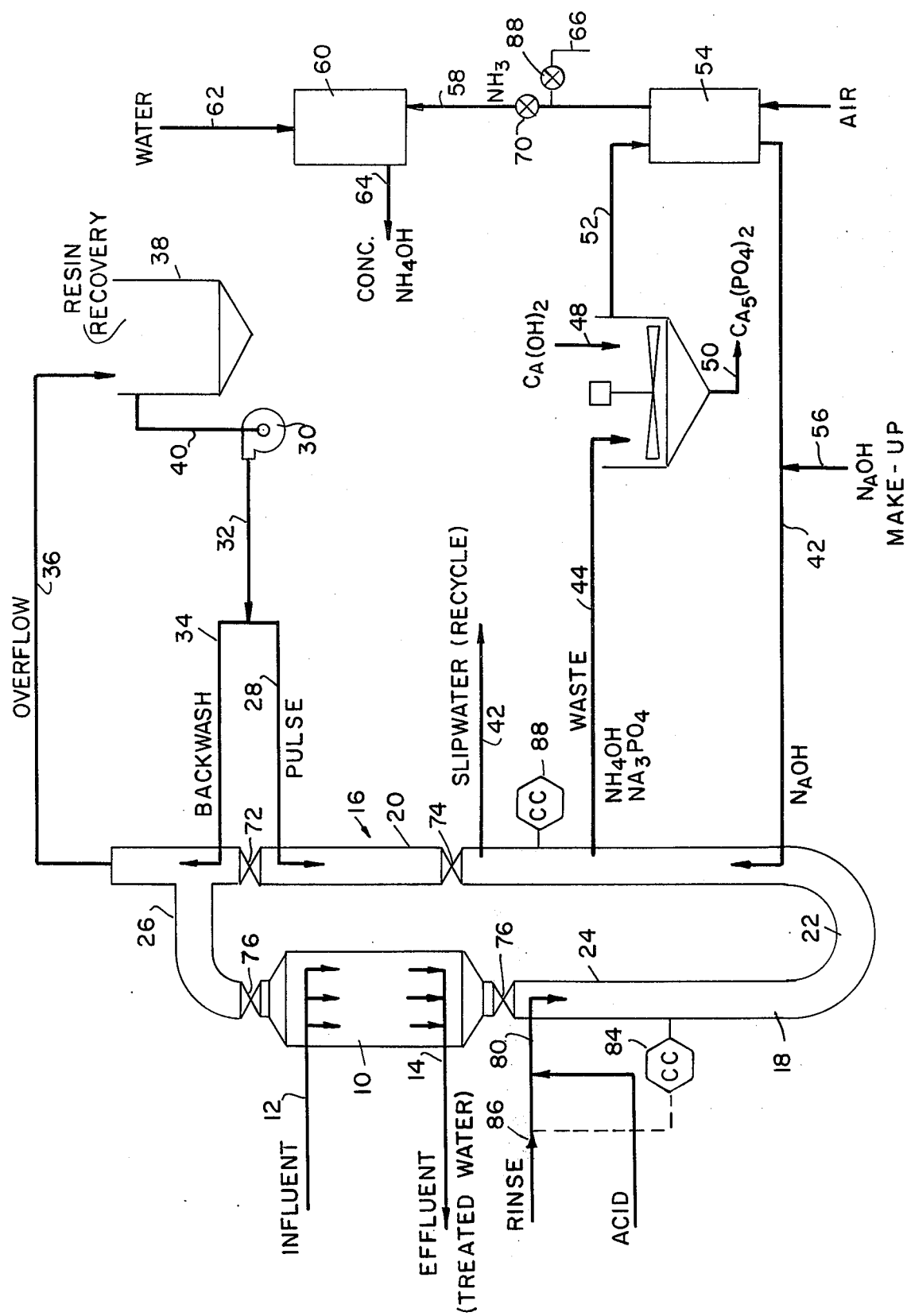

PREFERENTIAL REMOVAL OF AMMONIA AND PHOSPHATES

CROSS REFERENCE TO RELATED APPLICATION

This is a continuation of application for United States Letters Patent Ser. No. 398,523, filed Sept. 18, 1973, now abandoned.

BACKGROUND OF THE INVENTION

There are instances where solutions contain many additives only several of which are objectionable but which cannot be removed by ion exchange because of the expense of rejuvenating the ion exchange resin. As an example, consider the tertiary treatment of sewage. After sewage water is subjected to primary and secondary treatment, the organic substances have been pretty well broken up and bacteria have been substantially eliminated by processes such as chlorination but there are still a number of substances which are objectionable. Usually ammonium salts result from the degradation of the organic components and phosphates are present from detergents which have been added to the sewage by residential and commercial facilities.

These components are objectionable because ammonium salts and phosphates encourage the growth of algae. When the concentration of algae becomes excessive in the water into which the sewage is dumped, fish are killed because when algae die and decompose they use up much of the oxygen from the water.

In addition to the ammonium salts and phosphates found in sewage water, calcium, magnesium, sodium, nitrates, sulphates and chloride are also present in varying amounts. The presence of these substances is acceptable but the standard ion exchange technique removes them along with the major pollutants, that is, ammonia and phosphates and thus they block out resin capacity. In order to regenerate the resin, it is therefore necessary to remove the calcium, magnesium, sodium, sulphates, nitrates and chloride as well as the phosphates and ammonia. Thus in order to regenerate the resin, it is necessary to treat it with an excessive amount of regenerant. This adds considerable cost to the process.

SUMMARY OF THE INVENTION

It is an object of the present invention to overcome drawbacks in the prior art such as those discussed above. Accordingly, ferric hydroxide is deposited inside of the matrix of the cation exchange resin beads and is contacted with the water to be treated to remove phosphates and ion exhange removes ammonia and is intermittently regenerated by sodium hydroxide.

BRIEF DESCRIPTION OF THE DRAWINGS

The drawing is a schematic view of a treatment plant made in accordance with the present invention.

DETAILED DESCRIPTION OF THE PREFERRED EMBODIMENT

In the drawing a treatment vessel 10 is shown with an influent line 12 for bringing in water to be treated and an effluent line 14 for carrying away treated water. The water which contains additives common to any sewage water including calcium, magnesium and sodium salts, as well as sulphates and chlorides, also contains phosphates which are undesirable, as explained above. The water is treated by contacting it with a specially treated cation exchange resin which is present in the treatment vessel.

The resin is treated so that a metallic hydroxide is deposited inside the matrix of each of the resin beads. This is done by sorbing iron in the resin and placing the resin in ammonium or sodium hydroxide. In the case where it is desirable to sorb iron, the iron can be provided by a ferric salt such as ferric nitrate, ferric sulphate or ferric chloride. When ferric chloride is contacted with the resin, it separates into ferric and chloride ions. The ferric ions settle on the ion exhange site present in the matrix of each resin bead. The chloride can be washed away. Thereafter, the resin is thrown into a reactant hydroxide which may be sodium hydroxide or ammonium hydroxide. As a result, ferric hydroxide is implanted inside of the matrix of the resin beads at locations other than the ion exchange sites so that the ion exchange sites are free to sorb the ammonium ions which are present in the sewage water or other solution being treated. Phosphate ions are attracted by the ferric hydroxide so that as the sewage water passes through the treatment vessel 10 both phosphate and ammonium ions are sorbed on virtually every bead of the ion exchange resin and thus the solution is free of these pollutants.

The resin is prepared from any standard cation resin of the strong acid type, such as the resin sold under one of the trade names Dowex HCR-W, IR-120, or Doulite C-20.

The resin is regenerated and intermittently fed to the treatment vessel 10 by a regenerating circuit indicated generally at 16. The regenerating circuit 16 includes the treatment vessel 10, as well as a conduit 18. Conduit 18 has a straight section 20 which extends vertically and parallel to the longitudinal axis of the treatment vessel 10. The straight section 20 is connected at its bottom to a U-shaped section 22 which connects the straight section 20 with a vertically extending resin feed section 24 which extends upward to the bottom of the treatment vessel 10. Extending from the top of the treatment vessel 10 to the straight section 20 is a curved resin exhaust section 26 which connects with the vertical straight section 20 at a location adjacent to the top of the straight section 20.

In order to provide for resin regeneration, resin is intermittently moved through the regenerative circuit 16 so that regenerated resin moves upwardly through the resin feed section 24 and into the treatment vessel 10 and then out thrugh the resin exhaust section 26 and downward through the straight section 20. This movement of resin occurs only after the influent of sewage water is shut off and continues only long enough to replenish the contaminated resin within the treatment vessel 10 with regenerated resin.

The movement of resin takes place because of a pulse of water and resin mixture which is fed through a pulse line 28 under pressure impressed by a circulation pump 30. The pulse line 28 is connected to the pump 30 by means of a pump exhaust line 32. Since movement of fluid through the pulse line 28 will move entrained resin downward through the straight section 20 and then upward through the resin feed section 24 and into the treatment vessel 10 and since resin within the vessel 10 will be moved upward through the resin exhaust section 26, it is possible that there will be an overflow of resin at the upper portion of the straight section 20. Some of the fluid being pumped into the system by the pump 30 bypasses the pulse line 28 through a back wash line 34 which is connected to the straight section 20 at a location slightly above that which the pulse line 28 is connected thereto and adjacent to the connection between the resin exhaust section 26 and the straight section 20.

Excess resin washed upwardly by the back wash water coming through the back wash line 34 moves upwardly and out of the conduit 18 and out through an overflow line 36 and into a resin recovery reservoir 38. A supply of water is always available and is fed to pump 30 through a pump supply line 40 extending between the pump and the resin reservoir. Movement of the resin out of the treatment vessel 10 and movement of regenerated resin into the treatment vessel 10 can be provided without pressure buildups and in spite of temporary changes in the volume of the total amount of liquid within the system because differences in volume can be accommodated within the resin reservoir 38.

Since the energy to move the resin through the system is supplied by flowing water, in order to prevent the resin from being diluted in its aqueous transportation medium, water is withdrawn from the straight section 20 through a slip water line 42 located below the pulse line 28. The slip water can be recycled at the influent line 12.

The resin is regenerated when it is in the lower portion of the straight section 20 by sodium hydroxide which is fed through a regenerative supply line 42 which feeds sodium hydroxide upwardly in the straight section 20. The sodium hydroxide removes the ammonia and phosphates from the resin by reacting with the ammonium and phosphate ions to yield ammonium hydroxide and sodium phosphate. These products of reaction move out from the straight section 20 through a waste line 44 which leads to a reaction vessel 46.

The purpose of the reaction vessel 46 is to facilitate the conversion of the sodium phosphate and ammonium hydroxide into marketable and useful byproducts. To this end, calcium hydroxide (lime) is added to the reaction vessel 46 through line 48 and calcium phosphate is removed from the bottom of the vessel through line 50. Calcium phosphate is a solid and thus the addition of the lime affords a convenient way of eliminating the phosphates in a condensed form.

Sodium hydroxide and ammonium hydroxide are run off of the reaction vessel 46 and pass through a line 52 into an air sparger 54. The sodium hydroxide will pass through the air sparger 54 and out of it through the regenerative supply line 42 to be fed to the conduit and serve as regenerative. Since losses will occur, it is necessary to constantly supply a small amount of sodium hydroxide through a sodium hydroxide makeup line 56 which feeds into the regenerative supply line 42. Ammonia gas passes up through an ammonia supply line 58 to a water scrubber 60 where water is fed into it through a water line 62. Concentrated ammonium hydroxide leaves the water scrubber through a line 64.

If desired, ammonia gas can be taken off of the ammonia supply line through an ammonia takeoff line 66 by opening a valve 68 in the line 66 and closing a valve 70 in the line 58 between the line 66 and the scrubber 60. If ammonia gas is not desired, the valve 68 is closed and the valve 70 in the line 58 is opened to allow the gas to flow into the water scrubber 60 to produce concentrated ammonium hydroxide. The choice is really one of byproducts and marketability will determine the choice.

In operation, sewage is run through the influent line 12 to pass through the resin within the treatment vessel 10 which has been specially prepared, as described above, and out through the effluent line 14 for a predetermined time. The time is selected so that the flow of fluid will not be longer than the resin is effective. During this time, sodium hydroxide is being added to the lower portion of the straight section 20 through regenerative supply line 42 and ammonium hydroxide and sodium phosphate are taken off through the waste line 44.

After sewage water is passed through the treatment vessel 10 for the predetermined time, a valve 72 automatically closes. The valve 72 is in the straight section 20 between the pulse line 28 and the back wash line 34 so that the pulse water will move the resin downward when the valve 72 is closed. The movement of the resin is facilitated because as the valve 72 opens a valve 74 which is below the valve 72 in the straight section 20 and above the slip water line 42 opens. Valves 76 and 78 which are placed in the conduit 18 below and above the treatment vessel 10 respectively, also open simultaneously with the valve 74 to allow an upward flow of regenerated resin into the treatment vessel 10. The resin flows for a time which is long enough to allow a change of resin within the vessel 10. Thereafter, valves 74, 76 and 78 close while valve 72 opens. This prevents movement of the resin and allows excess water to pass upward through the overflow line 36 to the resin reservoir 38. While the valves 74, 76 and 78 are closed, sewage water passes through the treatment vessel 10.

In order to assure effective operation of the resin within the treatment vessel 10, it is necessary to rinse it to remove any salts which have been retained by the regenerating process and also to maintain the proper acidity. To this end, rinse water is added through a rinse line 80 which connects with the resin feed section 24 below the valve 76 and acid is added through an acid supply line 82 which connects with the rinse line 80 and which supplies an acid such as hydrochloric or sulfuric to the rinse water when necessary to lower the pH. The rinse water is added automatically when needed. This is so because the conductivity of NaOH is higher than water and a conductivity control 84 senses when the conductivity of the upward moving NaOH in the resin rinse section 24 is high enough to indicate that there is an absence of rinse water in it. When this occurs, the conductivity control 84 opens a valve 86 in the rinse line 80. As soon as the conductivity becomes low enough to indicate that the resin has been sufficiently rinsed with water, the conductivity control 84 closes the valve 86.

Similarly, a conductivity control 88 determines when there is too much water in the resin suspension passing down the vertical section 20 and when too much water is present automatically opens a valve 90 in the slip water line 42 to pass excess water out of the conduit 18.

The foregoing describes but one preferred embodiment, other embodiments being possible without exceeding the scope of the present invention as defined in the following claims.

What is claimed is:

1. The method of removing ammonia ions and phosphate ions from a solution comprising the steps of:
    contacting beads of cation exchange resin of the strong acid type with a solution containing a ferric salt so that ferric ions are sorbed on the matrix of each of the cation exchange resin beads;

subsequently, washing said cation exchange resin to remove the non-ferric ions of said ferric salt solution from said cation exchange resin beads;

subsequently, contacting the resin and said sorbed ferric ions deposited therein with a reactant hydroxide to yield ferric hydroxide with said ferric hydroxide deposited within said matrices at locations other than the ion exchange sites of said matrices;

then, flowing said solution through said beads so that ammonium and phosphate ions are sorbed by said resin, to thereby remove said ammonium and phosphate ions from said solution;

then, regenerating said resin by contacting said beads with sodium hydroxide so that said sodium hydroxide reacts with said ammonium and phosphate ions to yield sodium phosphate and ammonium hydroxide; and removing said sodium phosphate and said ammonium hydroxide from said resin beads.

2. The method defined in claim 1 wherein said ferric salt is ferric chloride.

3. The method defined in claim 1 wherein said reactant hydroxide is selected from the class consisting of sodium hydroxide and ammonium hydroxide.

4. The method defined in claim 1 comprising the further step of reacting the sodium phosphate and ammonium hydroxide removed from said resin with calcium hydroxide to yield calcium phosphate, ammonium hydroxide and sodium hydroxide.

5. The method defined in claim 4 comprising the further step of flowing said sodium hydroxide and said ammonium hydroxide through an air sparger to obtain ammonia gas.

6. The method defined in claim 5 comprising the further step of scrubbing said ammonia gas in a water scrubber to obtain ammonium hydroxide.

* * * * *